3,083,984
Patented Apr. 2, 1963

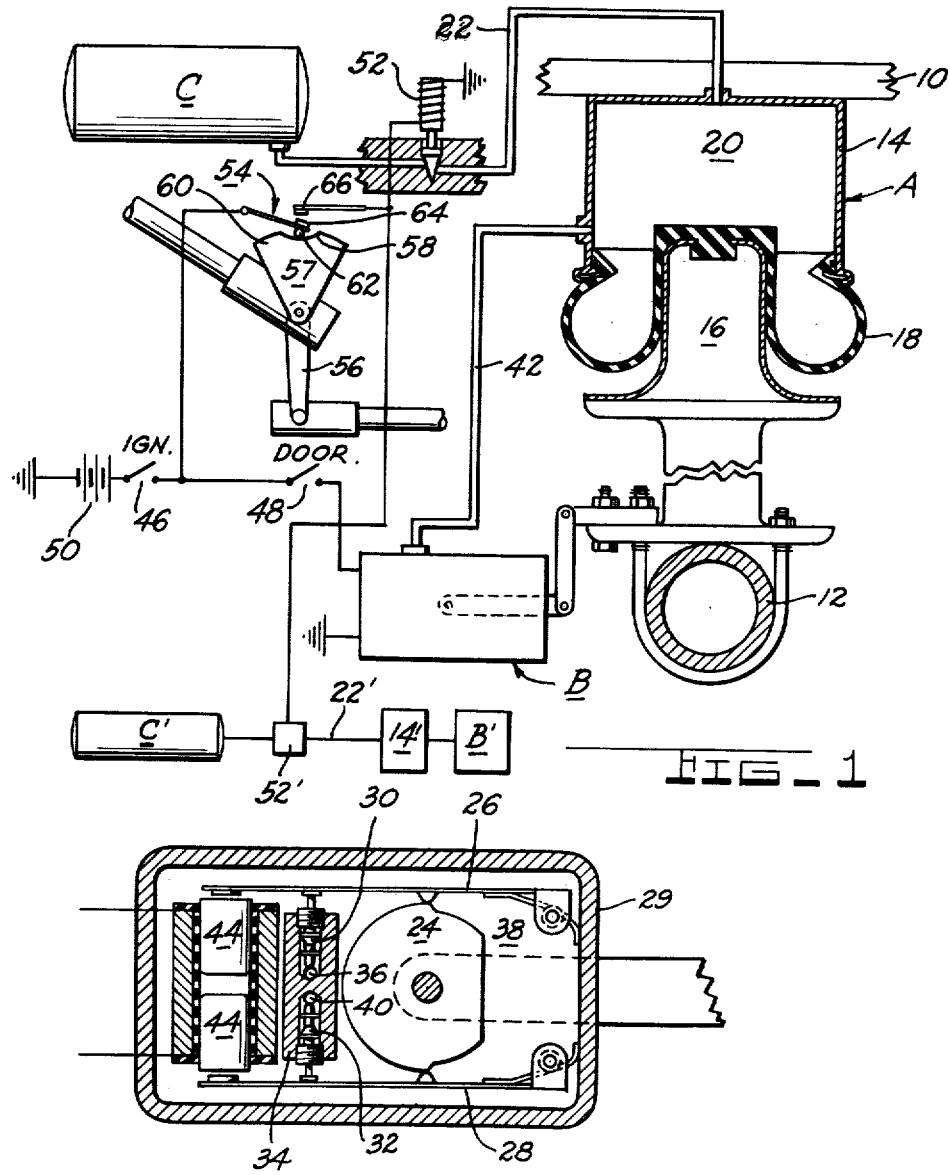

3,083,984
ANTI-ROLL AIR SUSPENSION
Charlie N. French, South Bend, Ind., assignor to The Bendix Corporation, a corporation of Delaware
Continuation of abandoned application Ser. No. 778,537, Dec. 5, 1958. This application May 23, 1962, Ser. No. 197,035
6 Claims. (Cl. 280—124)

The present invention relates to means for varying the spring rate for air suspension systems; and more particularly to an air suspension system for an automotive vehicle in which means are provided for stiffening the suspension system to counteract inertia forces. This application is a continuation of my copending application Serial No. 778,537, filed December 5, 1958, now abandoned.

An object of the present invention is the provision of a new and improved air suspension system wherein the effective volume of the "air bags" is changed to counteract the forces on the air bags which are produced as a result of inertia forces on the vehicle.

Another object of the present invention is the provision of a new and improved air suspension system for an automotive vehicle, wherein an auxiliary reservoir is normally communicated to an air bag of the suspension system and wherein the volume of the reservoir is isolated from the air bag of the suspension system when the steering mechanism of the vehicle is operated.

Further objects and advantages of the invention will become apparent to those skilled in the art to which the invention relates from the following description of the preferred embodiment described with reference to the accompanying drawing forming a part of this specification, and in which:

FIGURE 1 is a schematic drawing of an air suspension system for an automotive vehicle embodying principles of the present invention; and FIGURE 2 is a cross sectional view of a valve shown in FIGURE 1.

The air suspension system shown in the drawing generally comprises: an air bag A which is interpositioned between the frame 10 of the vehicle and the axle 12 of the vehicle to normally resiliently support the body a predetermined distance above the axle; a levelling valve B which admits and exhausts air pressure from the air bag A to control the level of the frame 10 above the axle 12; and a reservoir C whose internal volume is normally communicated to the air bag A and which is valved off from the air bag A when inertia forces vary the loading upon the air bag A.

The air bag A may be of any suitable design, and as shown generally comprises an inverted can or cylinder member 14 carried by the frame 10 and a piston member 16 which is fastened to the axle 12 and which is suitably guided to move in and out of the cylinder member 14 to absorb road shocks etc. during operation of the vehicle. A suitable rubber diaphragm 18 is positioned over the top of the piston member 16 with its outer edge suitably sealed to the lower edge of the cylinder member 14; and the internal volume 20 that is enclosed thereby is suitably proportioned so that it amounts to approximately one-half of that required to be pressurized by the piston member 16 in order to produce the desired spring rate between the body and axle of the vehicle. The remainder of the volume which is necessary to provide the desired spring rate is provided by means of the reservoir C whose internal volume is normally connected to that of the cylinder member 14 by means of the pneumatic interconnecting line 22. During normal operation of the vehicle, therefore, inward movement of the piston 16 is free to pressurize both the volume 20 within the cylinder member 14 of the air bag A and the volume of the reservoir C.

Inasmuch as the load which is carried by a vehicle varies from time to time, leveling valve B is provided to periodically vary the normal pressure carried by the air bag A and reservoir C to thereby maintain the spacing between the frame 10 and the axle 12 substantially a predetermined distance apart. Leveling valve B comprises a rotatable cam 24 having a pair of cam followers 26 and 28 suitably pivoted to a housing 29 to bear against opposite sides of the rotatable cam 24. A normally closed pressure inlet valve 30 and a normally closed exhaust valve 32 are positioned on the opposite side of the cam 24 from the pivotal points of the cam followers 26 and 28, and each is adapted to be opened by inward movement of the cam followers 26 and 28 respectively. The valve mechanisms 30 and 32 are formed by means of tire valve cores the heads of which project out of opposite sides of a valve body 34 into engagement with the cam followers 26 and 28 respectively. Downward movement of the cam follower 26, therefore, causes the pressure inlet valve 30 to communicate its pressure inlet port 36 to the internal chamber 38 of the valve body 34; and upward movement of the cam follower 28 causes the exhaust valve 32 to open communication between the internal chamber 38 and the valve exhaust port 40. The internal chamber 38 is suitably sealed off from the atmosphere, and the control pressure that is developed therein is communicated to the internal chamber 20 of the air bag A through a continually open line 42. In order that the distance between the frame 10 and axle 12 will be maintained a predetermined distance apart under varying load conditions, a pair of solenoids 44 are positioned between the cam followers 26 and 28 to urge the cam followers inwardly when the solenoids 44 are energized. Actuation of the solenoids 44 is controlled by an electrical circuit having the vehicle's ignition switch 46 and a normally closed door switch 48 in series with the vehicle's battery 50. The door switch 48 is so arranged as to be closed when the door on the driver's side of the vehicle is open so that the electrical circuit will be energized when people are getting into or out of the vehicle. Assuming that people are getting into the vehicle, the frame 10 is displaced initially by their weight towards the axle 12 causing the cam 24 to rotate counterclockwise as seen in FIGURE 2. Inasmuch as the door must be open for the occupants to get in place, the solenoids 44 will be energized to draw the upper cam follower 26 downwardly to open the pressure inlet valve 30 to thereby increase the pressure in the air bag 20. Pressure continues to flow until the original spacing of the frame 10 and axle 12 is assumed whereupon the cam 24 will be again centered in the position shown in FIGURE 2. In this position the cam 24 biases both cam followers 26 and 28 apart so as to permit the pressure inlet valve 30 and the exhaust valve 32 to close. This leveling operation takes place quite rapidly; and by the time that the door is closed to de-energize the circuit, the frame 10 and axle 12 will have reached their predetermined spacing.

As previously indicated the new and improved system of the present invention includes means for increasing the spring rate of the air suspension system when inertia forces are produced upon the vehicle body. The invention may be used to prevent dip during large decelerations of the vehicle, but as shown in the drawing is used to minimize swaying of the body during cornering of the vehicle. Two or more air bags can be used to support the frame 10 above the vehicle's axles; and in the system shown in the drawing, the air bag 14 will be positioned adjacent one of the front wheels of the vehicle and an identical air bag 14' will be positioned adjacent the other front wheel of the vehicle. The air bag 14' will have attached thereto a reservoir system identical with that provided for the air bag 14, which system includes the reservoir C' and interconnecting line 22'. The air bag 14' will also have communicated thereto a leveling valve B' identical with that which levels the air bag 14, and which is controlled from the spacing of the frame and axle adjacent its side of the vehicle.

Where air bags are used adjacent each front wheel of the vehicle, a cornering of the vehicle will produce inertia forces on the frame tending to collapse the air bag on the radially outer side of the vehicle, and tending to expand the air bag on the radially inner side of the vehicle. As previously indicated, the reservoirs C and C' and the air bags 14 and 14' are designed so that normal volume subject to compression will include that of the reservoirs C and C' as well as that within that of the respective air bags 14 and 14'. The shifting of forces of the vehicle's body from the radially inner to the radially outer sides of the vehicle is what is commonly termed roll, and the preferred system shown in drawing reduces the amount of roll that is experienced by the body by valving off the reservoir C or C' that is on the radially outer side of the vehicle from its air bag during a turn. While a considerable roll reduction will be obtained by merely valving off the reservoir on the outside of the vehicle from its air bag while leaving open the reservoir on the inside of the vehicle from its air bag, applicant prefers to valve off both of the reservoirs from their air bags whenever a turn of the vehicle is produced.

Roll of the vehicle can be sensed in any one of a number of ways, but in applicant's preferred embodiment, the valving off of the reservoirs C and C' from their respective air bags will be produced by a suitable mechanism operating off of the vehicle's steering system. The preferred embodiment shown in the drawing includes normally open solenoid valves 52 and 52' which are used to valve off the reservoirs C and C' respectively from their respective air bags. The solenoids 52 and 52' are controlled by a suitable switch mechanism 54 that is operated from the vehicle's steering mechanism, and which is normally open only when the steering mechanism is adjusted for vehicle straight line motion, and which will be closed whenever the steering mechanism is moved out of its normal position to produce a cornering of the vehicle. The switch mechanism shown in the drawing includes a cam 57 suitably affixed to the pivotal shaft which extends out of the gear box at the base of the steering column, and which rotates the pitman arm 56 that operates the drag links etc. which in turn corner the vehicle. The cam 57 has a centrally located depression in its camming surface 60—which depression 58 is adapted to receive the engagement point of the cam follower 62. The cam follower 62 is suitably electrically insulated from the surrounding structure and is provided with an electrical contact 64 which is adapted to close with respect to the cooperating electrical contact 66 of the switch when the cam follower 62 rides up out of the depression 58 in the camming surface 60. The cam follower 62 is electrically connected to the ignition switch 46 of the vehicle, and the contact 66 is electrically connected to actuate both of the solenoids 52 and 52'. When the steering wheel of the vehicle is turned in either direction, therefore, the cam 57 is rotated to cause the contact 64 to engage the contact 66 and thereby energize both of the solenoids 52 and 52' to valve off both of the reservoirs C and C' from their respective air bags 14 and 14'. By use of this arrangement the spring rate of both air bags 14 and 14' is increased to simultaneously increase the resistance to compression of the air bag on the outside of the vehicle while also increasing the resistance to expansion of the air bag on the inside of the vehicle.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. In a vehicle having a body whose weight is supported from the undercarriage of the vehicle by an air bag of predetermined volume, and vehicle steering mechanism having a manually moved control portion which when actuated from a normal position induces a train of events which cause inertia forces to alter the force upon said air bag: a pneumatic reservoir of predetermined volume normally communicated to the volume of said air bag, normally open valve means positioned between said reservoir and said air bag to normally interconnect their volumes, said valve means having parts movable to a closed position to isolate said reservoir from said air bag, and an immediate responding type of mechanism transferring movement of said manually moved portion of said steering mechanism to said valve means to close said valve means, said mechanism being of the type which upon a slight movement of said manually moved portion of said steering mechanism out of its normal position causes a movement of said control valve parts to their closed condition before any appreciable inertia forces are produced.

2. In a vehicle having a body whose weight is supported from the undercarriage of the vehicle by first and second spaced apart air bags having predetermined and separated volumes, and vehicle steering mechanism having a manually moved control portion which when moved in a first direction from its normal position causes inertia forces to increase the compressive force acting on said first air bag: first and second pneumatic reservoirs having predetermined volumes and which are normally communicated to respective ones of said air bags, normally open solenoid operated valve means which normally communicates said first reservoir to said first air bag and said second reservoir to said second air bag, and electrical switch means actuated by said manually moved control portion of said vehicle steering mechanism, said electrical switch means being operatively connected to said valve means to close said valve means whenever said manually moved portion of said steering mechanism is moved out of its normal position.

3. In a vehicle having a body whose weight is supported from the undercarriage of the vehicle by first and second laterally spaced apart air bags having predetermined and separated volumes, and vehicle steering mechanism having a manually moved control portion which when moved in a first direction from its normal position causes inertia forces on said body to increase the compressive force acting on said first air bag: first and second pneumatic reservoirs having predetermined volumes and which are normally communicated to respective ones of said air bags, normally open solenoid operated valve means which normally communicates said first reservoir to said first air bag and said second reservoir to said second air bag, and electrical switch means actuated by said manually moved control portion of said vehicle steering mechanism, said electrical switch means being operatively connected to said valve means to close said valve means and isolate both air bags from their reservoirs whenever said manually moved portion of said reserving mechanism is moved out of its normal position.

4. In a vehicle having a body whose weight is supported from the undercarriage of the vehicle by first and second laterally spaced apart air bags having predetermined and separated volumes, and vehicle steering mechanism having a manually moved control portion which when moved in a first direction from its normal inline vehicle motion producing position induces a train of events which cause inertia forces to increase the compressive force acting on said first air bag and decrease the compressive force acting on said second air bag: first and second pneumatic reservoirs having predetermined volumes and which are normally communicated to respective ones of said air bags, normally open solenoid operated valve means which normally communicates said first reservoir to said first air bag and said second reservoir to said second air bag, and electrical switch means actuated by said manually moved control portion of said vehicle steering mechanism, said electrical switch means causing said valve means for both air bags to be open when said manually moved control portion is in its normal position, and said electrical switch means causing both valve means to be closed whenever said manually moved control portion is moved out of its normal inline position.

5. In a vehicle having an inertia responsive mass supported from an undercarriage by suspension mechanism having low and high spring rate providing conditions, and a vehicle steering mechanism having a manually moved control portion which in a normal position causes inline motion of the vehicle and which in an actuated position causes a cornering of the vehicle: a suspension control member which in its normal position causes said suspension mechanism to be in its low spring rate providing condition and which when in another position causes said suspension system to be in its high spring rate provding condition, and an immediate responding type of mechanism fixed to said manually moved portion of said steering mechanism and operatively connected to said control member, said mechanism being of the type which upon a predetermined movement of said manually moved portion of said steering mechanism out of its manual position causes an immediate shifting of said control member to its other position.

6. In a vehicle having an inertia responsive mass supported from an undercarriage by laterally spaced apart suspension mechanisms each having low and high spring rate providing conditions, and a vehicle steering mechanism having a manually moved control portion which in a normal position causes inline motion of the vehicle and which in an actuated position causes a cornering of the vehicle: a suspension control member which in its normal position causes each of said laterally spaced apart suspension mechanisms to be in their low spring rate providing condition and which when in another position causes both said suspension mechanisms to be in their high spring rate providing conditions, and an immediately responing type of mechanism fixed to said manually moved portion of said steering mechanism and operatively connected to said control member, said mechanism being of the type which upon a predetermined movement of said manually moved portion of said steering mechanism out of its normal position causes an immediate shifting of said control member to its other position.

References Cited in the file of this patent

UNITED STATES PATENTS

| 2,804,311 | Pobanz | Aug. 27, 1957 |
| 2,901,241 | Lautzenhizer | Aug. 25, 1959 |

FOREIGN PATENTS

| 518,848 | Great Britain | Mar. 8, 1940 |

UNITED STATES PATENT OFFICE

CERTIFICATE OF CORRECTION

Patent No. 3,083,984                                         April 2, 1963

Charlie N. French

It is hereby certified that error appears in the above numbered patent requiring correction and that the said Letters Patent should read as corrected below.

Column 4, line 59, for "reser-" read -- steer- --.

Signed and sealed this 31st day of December 1963.

(SEAL)
Attest:
ERNEST W. SWIDER

EDWIN L. REYNOLDS

Attesting Officer                                Acting Commissioner of Patents